Dec. 13, 1955  R. S. WELLONS ET AL  2,726,707

SEALING MACHINE AND METHOD

Filed Aug. 30, 1954  2 Sheets-Sheet 1

Inventors
Richard S. Wellons
Arthur S. Russell
By Theodore C. Browne
Attorney

Inventors
Richard S. Wellons
Arthur S. Russell
By Theodore C. Browne
Attorney 2,726,707
Patented Dec. 13, 1955

2,726,707

SEALING MACHINE AND METHOD

Richard S. Wellons, Arlington, and Arthur S. Russell, Chelmsford, Mass., assignors to W. R. Grace & Co., a corporation of Connecticut Application August 30, 1954, Serial No. 452,885

3 Claims. (Cl. 154—42)

This invention relates to the formation of fused seams in sheet thermoplastic material. It may be used advantageously in the fabrication of plastic articles, such as clothing, but is especially useful in the manufacture and sealing of plastic food bags and will be so described.

Plastic food bags are generally made from sheets or from extruded tubes of thin thermoplastic material. In the case of sheets, the longitudinal edges of the sheet are lapped and are fused together under heat and pressure to form a tube. One open end is then heat sealed to form a bag. In the case of tubes, an appropriate length is cut from a roll of the flattened tubing, and one end is sealed by fusion to form a bag. The food processor, after he inserts the foodstuff, may seal the bag by heat fusion, but more commonly he seals it by twisting the neck of the bag and securing it with a clip or tie.

Two methods of heating are commonly used. In the first, either one or both of the sealing jaws are heated, and the heated jaws are closed with the seam area of the plastic pinched between them. The jaws are held closed until the plastic between them has been heated by conduction and the two laminae have been fused together.

The second method induces the heat directly in the material. The jaws are not heated but are made parts of a high frequency electric circuit so that material between the jaws is heated to fusion temperature by the dielectric loss in the material when the high frequency circuit is energized.

It is the general experience that faulty seals are produced all too frequently. If an unoriented thermoplastic, such as polyethylene, be taken as an example and the bag made from it is submitted to a burst test where air at increasing pressure is admitted into the bag, failure usually does not occur in the film but at isolated places along the extent of the seam. The two walls of the bag separate, and a passage develops between them. Frequently the entire seam delaminates. Plasticized polyvinyl chloride behaves in a similar manner. When oriented films typified by polyvinylidene copolymers are tested in this manner, in addition to delaminating at localized points, it usually will be the experience that blow-outs occur in or immediately adjacent the seam area and occur at a pressure which corresponds on the average to about 60 per cent of the strength of the films itself. This weaking in the zone of the end seam, which occurs in oriented film, comes about because the heating necessary to form the seal disorients the film in its immediate vicinity. Consequently, the great increase in strength which orientation of the film achieves is lost in an area which is immediately adjacent to the sealed surface. Since foodbags must be thin to be economically feasible, the food processor occasionally may find a heavy article like a ham or a turkey dropping through an end seam which is not strong enough to stand the weight. This occurrence in a high production food processing line is disrupting and expensive.

Upon examining the types of failure which occurred in the burst test and upon making cross sections through the seals, we noticed a line at the junction of the upper and lower plastic layers when the cross section was examined under the microscope. We then tried sealing films of different colors together and found that, save for a narrow streak along the line where the layers came in contact, the two colors clearly appeared in their original positions. It seemed probable, therefore, that as seams are presently made, plastic masses forming the upper and lower laminations are not co-mingled and interfused but, on the contrary, tend to persist as separate laminations adhered on their adjacent surfaces. Where the adhesion is less than perfect, delamination occurs.

Since we had discovered a continuing tendency for the films to persist unmingled despite heat and pressure sealing and consequently to blow out at spots where local surface conditions reduce the adhesion of film to film, we proposed to destroy the film structure and to cause the flow and repositioning of that portion of the plastic mass which is engaged by the sealing jaws. We did this by subjecting the seam area to a preliminary heating step before the full sealing pressure was applied, continuing the heating for a time sufficient for the material in the seam area to reach a highly plastic, flowable state, and then applying full sealing pressure to the seam area.

The stops which move into and out of position and so control the relative spacing of the sealing jaws during the heating and the subsequent seam forming steps can be moved mechanically, as by cams, or electrically, as by solenoids. We, however, prefer air operation, since it eliminates effect of random friction. Timing, pressure, and jaw travel can then be controlled more accurately than is the case when mechanically sliding parts are used.

We then found that additional strength could be given the seam by shaping the heated sealing jaws (or the electrodes if high frequency sealing is used) in such a manner that some of the plastic material is forced out from between the jaws toward the body of the bag by the final sealing pressure and so produces a seal which is characterized by a convexity which has been formed from displaced, flowed plastic material intruding into the bag. The resulting bags gave bursting values over 20 per cent higher than formerly, and frequently the strength of the seam area exceeded the strength of the single thickness of the original fillm.

In order to illustrate this invention clearly, all auxiliary apparatus, such as film cutters, etc., usually associated with plastic bag sealing machinery has been omitted. The machine appears in greatly simplified form.

Figure 1:
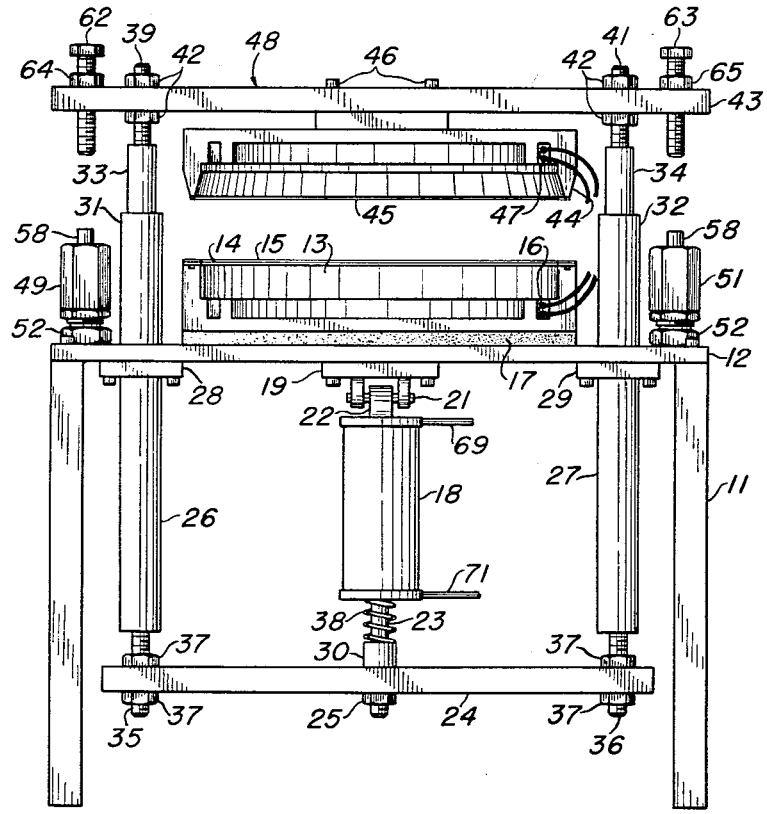
Figure 1 is a front elevation.

The machine comprises supporting legs 11, a top plate 12, which supports a conductively heated sealing jaw 13, the heating elements of which are shown at 16. The jaw is topped by a heat resistant compressible pad 14 and a covering of a heat resistant anti-sticking material 15, such as polytetrafluoroethylene ("Teflon"), to prevent the hot plastic from sticking to the jaw. Insulation 17 is interposed between the jaw 13 and the plate 12 to prevent heat loss through the plate. Air cylinder 18 is suspended from the plate 12 by the bracket 19, pin 21, and suspension boss 22 formed on the end of the air cylinder. Its piston supports piston rod 23, which passes through the boss 30, cushion spring 38, and bar 24 and is secured by the nut 25. Guide tubes 26 and 27 are attached to the plate 12 by their flanges 28 and 29, while extensions 31 and 32 of the tube pass through the plate 12 and extend above it. Rods 33 and 34 pass through the guide tubes 26 and 27 and are secured to the bar 24 by threaded terminal portions 35 and 36 and the nuts 37, 37. The upper ends of rods 33 and 34 are secured by similar threaded portions 39 and 41 and nuts 42 to a movable top plate 43. Upper sealing jaw 44, also covered with an anti-sticking material 45, such as "Teflon," is suspended from the plate 43 by the cap screws 46 and is heated by the heating element 47. The entire assembly will be referred to as head 48.

Figure 2:
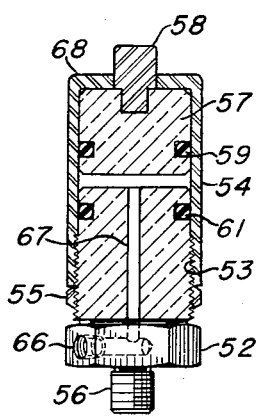
Figure 2 is a vertical section through one air-operated stop.

Stops 49 and 51, which are attached to the plate 12 by their threaded extensions 56 (best seen in the sectional elevation of Figure 2), comprise a fixed element 52. The upper portion of element 52 is threaded at 53 to receive the threaded end portion of cylinder 54. Vertical adjustment of this cylinder is maintained by the jam nut 55. Piston 57 is fitted inside of cylinder 54 and carries an extension 58, which projects through an orifice formed in the end wall 68 of cylinder 54. O ring 59 prevents the passage of air between the piston and cylinder wall. O ring 61 seals the passage between cylinder 54 and element 52. The air supply is through the port 66 and the bore 67.

For convenience in adjustment, cylinder 54 is made of hexagonal bar stock. Its threads number thirty-two to the inch. Thus, the turn of one flat of the cylinder represents a vertical adjustment of .005 of an inch. Adjustable stop screws 62 and 63, which engage the movable extension 58 of stops 49—49, 51—51 when the head 48 descends, are threaded through the top plate 43 and are locked in position by the nut 64 and 65.

Figure 4:
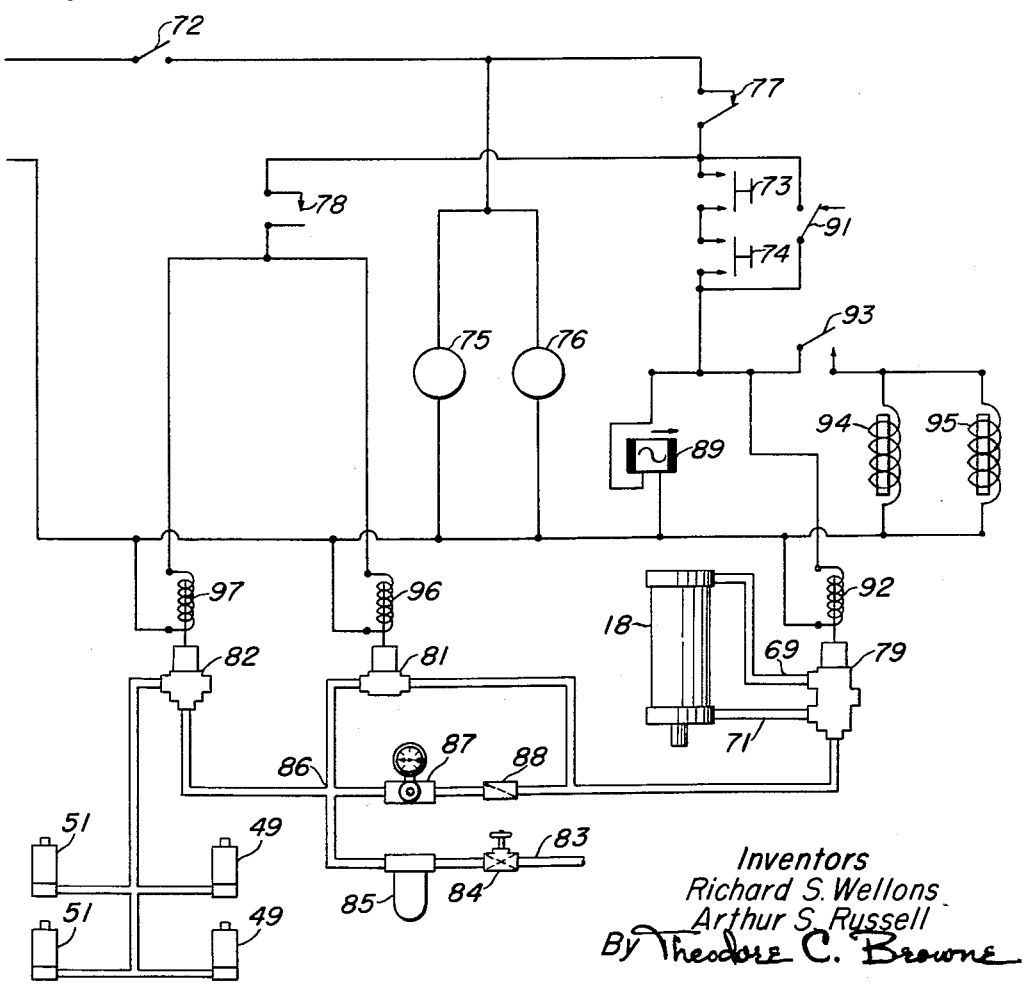
Figure 4 is a combined wiring and air piping diagram.

The controls of the machine are illustrated in Figure 4 and comprise a main switch 72 and manual control buttons 73 and 74. These buttons are wired in series and are arranged in conventional punch-press manner so that each hand of the operator must be out of the way and touching its button before the head begins its motion. The timing of the heating and sealing operation is secured by two constantly running synchronous timing motors 75 and 76, which move the normally closed contacts 77 and the normally open contacts 78 when the respective magnetic clutches 94, 95 connected to the timing motors are energized. Both contacts are arranged to return to the normal position when the magnetic clutches are de-energized. Their action controls the operation of the air cylinder 18 through solenoid valves 79 and 81 and 82.

High pressure air is admitted to the piping system through conduit 83, passes stop cock 84 and vapor lubricator 85, and is led to a cross 86. Air from one of the arms of the cross passes through the pressure regulator 87, through check valve 88, and to solenoid valve 79. Another arm of the cross is connected to solenoid valve 81, which when it is open by-passes the pressure regulator. The fourth arm of the cross connects the air supply to solenoid valve 82, the normal position of which leads high pressure air to the air stops.

In the stable condition, valve 82 is connected to the high pressure air line. Thus the pistons in stops 49—49 and 51—51 are projected upwardly and held in that position by the high pressure air. As a precaution against leakage or misfunctioning of the pressure regulator, the combined area of pistons 57 exceeds that of the cylinder 18. The piston of actuating cylinder 18 is held in the upward position by low pressure air, which is admitted to the bottom of the cylinder through conduit 71.

The sequence of events is as follows:

The operator spreads the plastic tubing across the lower sealing jaw 13 and then depresses the two switches 73 and 74. Relay coil 89 is now energized, closing its normally open sealing-in contact 91. Simultaneously the coil 92 of solenoid valve 79 is energized, which admits low pressure air through conduit 69 to the top of the piston and allows air beneath the piston to exhaust through conduit 71 to the atmosphere. Head 48 now descends until its stops 62—62 and 63—63 engage the upthrust stops 49—49 and 51—51. As head 48 comes into position, it closes switch 93, energizing clock clutches 94 and 95, and thus starting the timing cycle. Clutch 94 times out first, closing its normally open contacts 78 and energizing the solenoid 97 of valve 82. This allows the air in stop cylinders 49—49, 51—51 to exhaust to the atmosphere, and since solenoid 96 of valve 81 is simultaneously energized, high pressure air is admitted to the top of cylinder 18, forcing the head down and forcing the stops to their depressed position. After a suitable interval during which high pressure is maintained across the seal, clutch 95 times out, opening its normally closed contacts, restoring the solenoids to their normal position, dropping out relay 89, and restoring the system to its original condition ready to commence the next cycle.

It is to be understood that the machine just described may have R. F. electrodes substituted for the resistance heaters shown on the drawing. In this case, the usual precautions to prevent arcing, such as covering the electrodes with an insulator such as "Teflon," must be taken. Timing of the operation depends upon the constants of the R. F. circuit.

The configuration of the actual sealing surface of the jaw is subject to considerable variation in design, provided, however, that a radius or a bevel be formed along that margin of the upper jaw which faces the body of the bag. This is to provide the wedging and displacing force which forces the soft, plastic material back towards the body of the bag as the head 48 settles into its final position and compresses the plastic between the upper jaw 44 and the pad 14.

The time during which the film is heated and before the high pressure is applied obviously varies widely, since it is determined by the rate at which heat is conducted into (or generated within) the particular plastic which it is desired to seal and also by the thickness of the film. A film of vinylidene chloride 1 to 1½ thousandths of an inch thick may, as an illustrative example, be sealed with conditions as follows:

Temperature of metal in top sealing jaw 500° F.
Temperature of metal in bottom sealing jaw 250° F.
The resilient covering pad 14 of lower jaw 13 is a silicone rubber of approximately 60 durometer hardness.
The stops are set to permit an initial compression of 0.005 inch of covering pad 14 when two thicknesses of vinylidene copolymer lie between the jaws and head 48 is lowered by low pressure air.
Timer 76 is set to time out 0.5 second after the head reaches its fully closed position and has closed switch 93. Stops 49—49 and 51—51 are released at this instant, and head 48 then descends a further 0.025 inch. This movement is insured by the increased air pressure which is then admitted on top of the piston. Timer 75 is set to time out approximately 0.025 second later, completing the sealing cycle and raising the head.

Figure 3:
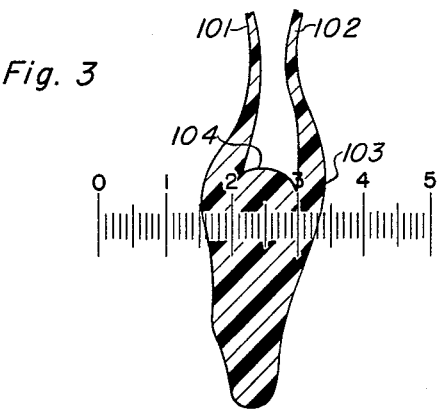
Figure 3 is a cross section through the seam area formed by the machine.

Figure 3 is a cross section of the improved seal. The figure was drawn from a micro photograph of a vinylidene copolymer oriented film taken through a measuring microscope. In this instance the walls of the bag originally were from 1 to 1½ thousandths of an inch thick. The scale in the figure reads in thousandths of inches. It will be noticed that the walls 101 and 102 of the bag taper from their original thickness until just at the fused area 103 they become .004 to .005 inch thick.

The displaced material, which is thrust backwards into the interior of the bag as shown at 104, forms an arc having a cord of .009 inch and the maximum extent of the actual fused area where the plastic has been thoroughly intermingled is .018 inches.

The marked increase in thickness of the walls immediately adjacent the seam area is characteristic of oriented (shrinking) film when sealed by this process, for a mass of film moves towards the heated zone as it becomes sufficiently heated to disorient and shrink. The thickened walls offset the loss in strength in the disoriented seam area. The convex portion 104 is, however, characteristic of all films whether oriented or not. It represents the flow of plastic wedged backwards by a radiused or beveled sealing jaw as the head is forced down into its final position. Thus the seal contrasts sharply with that produced when sealing bars come down on cold film. In that case the entire thickness of the seam area is frequently somewhat less than the combined thickness of the two laminae because conventional practice permits the head to lower and continuous pressure to be applied while the seam is being formed. Thus the jaw settles into the plastic as the seam area softens.

Seams formed according to our invention have now been used in the production of some millions of bags with excellent results. A comparison of rejections for seam failure before and after the method was adopted shows a reduction of approximately 50 per cent in rejections due to faulty seams.

We claim:

1. In a machine for joining sheets of thermoplastic material by heat and pressure having a pair of opposed sealing elements and means to reciprocate the sealing elements into and out of sealing engagement, means including retractable stops adapted, after contact with the material has been established, to arrest the movement of one of said sealing elements in its approach to sealing position, means adapted to release said stops at the expiration of a predetermined time, means to cause the closer approach of said sealing elements after said stops are released, and means including timing elements to release the jaws after a predetermined interval.

2. A machine for joining sheets of thermoplastic material by heat and pressure having a fixed sealing jaw provided with a resilient, compressible covering, a movable jaw, air cylinder and piston means for reciprocating said movable jaw normally held in raised position by a source of low pressure air, pneumatically operated stops normally connected to a source of high pressure air, switch means to initiate the movement of a valve, said valve being arranged to admit low pressure air above said piston and to release the air beneath it, thereby lowering the movable jaw until arrested by the pneumatic stops, timing and control means to release the air from said pneumatic stops and to admit high pressure air above the piston, thereby forcing the movable jaw into further engagement with the fixed jaw, and timing and control means to release the jaws after the lapse of a predetermined time interval.

3. The method of making improved seams in thermoplastic material by joining two opposed thermoplastic sheets under heat and pressure which includes placing two opposed thermoplastic sheets between a pair of cooperating sealing jaws, one jaw of which is provided with a compressible, resilient covering, the other of said jaws having an angularly disposed portion facing the body of thermoplastic material, closing the jaws into firm, heat-imparting contact with the thermoplastic sheets, but arresting any further compression of the sheets by interposing stops in the path of travel of said jaws, continuing the heating of the seam area of said sheets until the material of said sheets in the seam area is rendered plastic and flowable, then releasing the stops and forcing the jaws together under suddenly increased pressure to cause the angularly disposed portion of one of said jaws to wedge the plastic, flowable material backwards between said sheets and form a thickened reinforcement along the interior margin of the seam.

References Cited in the file of this patent
UNITED STATES PATENTS

| | | |
|---|---|---|
| 2,460,460 | Langer | Feb. 1, 1949 |
| 2,646,105 | Langer | July 21, 1953 |
| 2,651,350 | Casey et al. | Sept. 8, 1953 |